United States Patent [19]
Slykhouse et al.

[11] Patent Number: 5,574,722
[45] Date of Patent: Nov. 12, 1996

[54] PROTOCOL INDEPENDENT SWITCH

[75] Inventors: Tom Slykhouse, San Jose; Robert Smith, Los Altos; Dan Simone, San Jose, all of Calif.

[73] Assignee: Bay Networks, Inc., Santa Clara, Calif.

[21] Appl. No.: 407,680

[22] Filed: Mar. 21, 1995

[51] Int. Cl.$^6$ .................. H04L 12/413; H04L 12/417
[52] U.S. Cl. .................. 370/56; 370/85.3; 370/85.5
[58] Field of Search .................. 375/220, 377; 370/56, 85.3, 85.4, 85.9, 85.13, 85.14, 85.12, 99, 119, 85.5

[56] References Cited

U.S. PATENT DOCUMENTS

| | | | |
|---|---|---|---|
| 5,086,426 | 2/1992 | Tsukakoshi et al. | 370/85.14 |
| 5,197,083 | 3/1993 | Gandini et al. | 375/220 |
| 5,208,831 | 5/1993 | Ueno et al. | 375/220 |
| 5,249,183 | 9/1993 | Wong et al. | 370/85.3 |
| 5,347,268 | 9/1994 | Nelson et al. | 370/99 |
| 5,432,907 | 7/1995 | Picazo, Jr. et al. | 370/85.14 |

*Primary Examiner*—Benedict V. Safourek
*Attorney, Agent, or Firm*—Blakely, Sokoloff, Taylor & Zafman, LLP

[57] ABSTRACT

A data communications network providing for automatic reconfiguration of a hub concentrator or the like dependent on the protocol used by a device attached to the concentrator. The concentrator includes a circuit for receiving a message packet from a device coupled with the concentrator and for determining the protocol used in the transmission. Utilization of the disclosed circuit provides for automatic reconfiguration in the event a device is moved from one port on the concentrator to another port or a new device is connected to the concentrator.

13 Claims, 6 Drawing Sheets

PROTOCOL INDEPENDENT SWITCH

BACKGROUND OF THE INVENTION

1. Field of the Invention

The present invention relates to the field of computer networking, specifically to the field of local area networks using active hubs or concentrators.

2. Description of the Related Art

The present invention provides for a protocol independent switch or central device for use in a local area network or the like.

Historically, numerous protocols have evolved and have gained varying degrees of acceptance in the marketplace. Of course, it can be expected in the future that additional protocols will also be developed, for example, to fill new needs and to take advantage of new technologies.

Examples of existing protocols include the well known IEEE 802.3 standard—sometimes referred to as CSMA (carrier sense multiple access) or Ethernet—and the IEEE 802.5 standard, sometimes referred to as token ring. Existing protocols also include the FDDI standard.

Examples of emerging protocols include various proposals for 100 Mbps Ethernet.

Local area networks are known to include any number of central devices which provide for interconnection of data terminal equipment (DTE) in the network. Examples of DTE's include end user computers, file servers, printers, communications devices such as network modems and facsimile products and the central devices themselves. Central devices, as that term is used herein include any number of devices which allow for centralized interconnection of DTEs. Examples include hub concentrators, routers and bridges.

Importantly, from the standpoint of a network manager (an individual or group of individuals assigned the task of implementing and managing a local area network) for various reasons including availability of certain equipment, requirement for particular functionality, etc., it can be expected that DTEs in a local area network may utilize any of a plurality of the various protocols. It is, therefore, important that the central device to which these various DTEs is coupled, is configured to allow for proper communication dependent on the protocol of the particular DTE.

Figure 1:
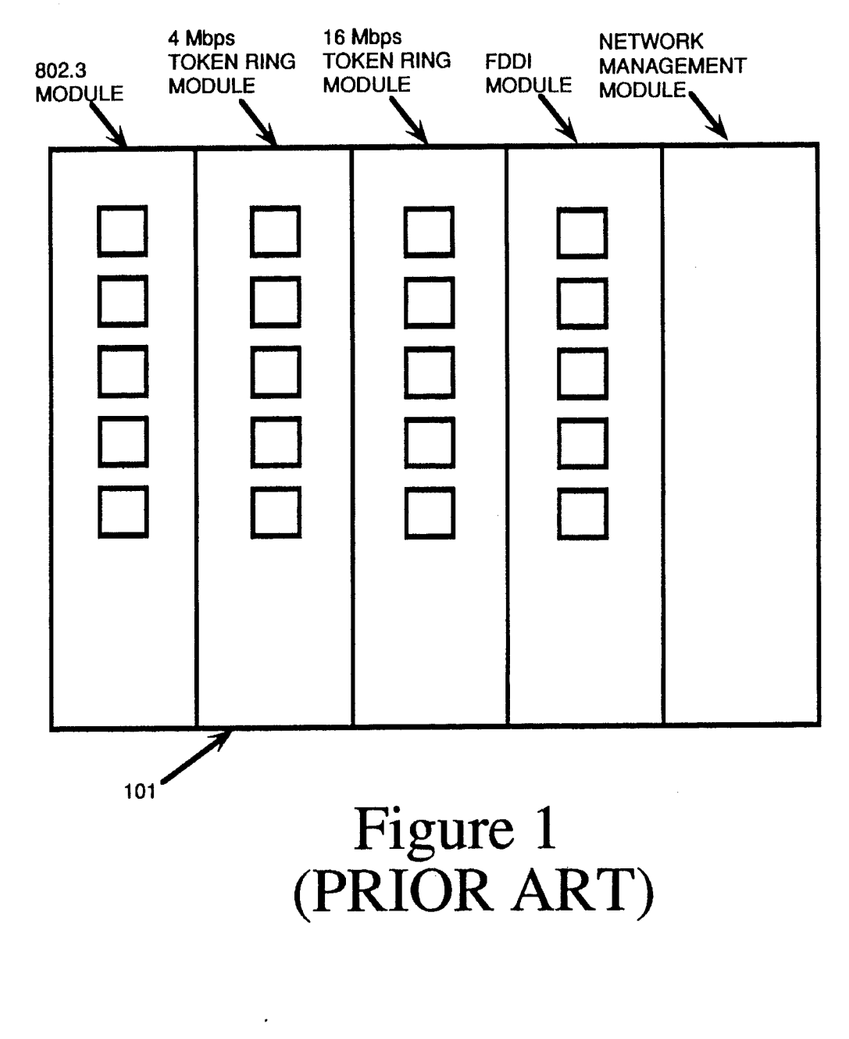
FIG. 1 is an illustration of a hub concentrator having a plurality of cards, each card being configured for a particular protocol.

Of course, one simple solution is to provide for multiple ports on the central device—for example, a set of ports to support DTEs transmitting in the CSMA protocol and a separate set of ports to support DTEs transmitting in the token ring protocol. In fact, this has been done in the prior art and is often implemented by allowing for insertion of multiple modular cards where, for example, a first modular card may have a plurality of ports for support of CSMA protocol DTEs and a second modular card may have a plurality of ports for support of token ring protocol DTEs. This is illustrated by FIG. 1 which shows a hub concentrator 101 having a plurality of insertable module cards for supporting various network protocols. This is not an ideal solution at least because if a user switches DTEs, say from using a DTE which utilized the CSMA protocol to using a DTE which utilizes the token ring protocol, the connection on the central device must be physically changed.

Figure 2:
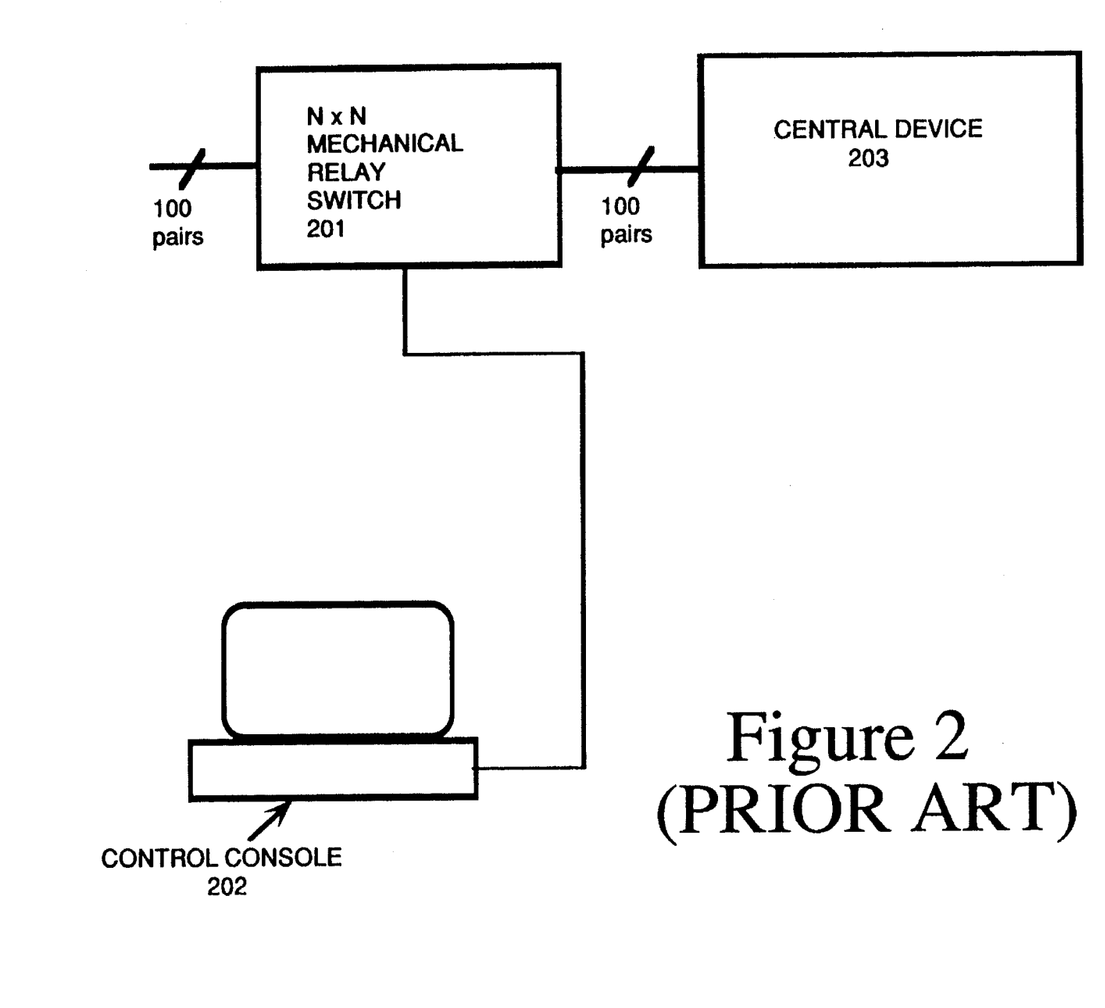
FIG. 2 is a block diagram illustrating a prior art front-end switching device which may be coupled to a central device in a local area network and used to physically change connection from port to port in the central device.

One alternative solution that has been proposed is to utilize a front-end switch such as mechanical switch 201 which provides for accepting a plurality of incoming connections from DTEs in the local area network. As illustrated, the switch 201 provides for accepting connections for 100 DTEs. The switch 201 may then be controlled (for example, through use of a separate controller such as illustrated as controller 202) to provide for switching of the incoming connections to appropriate ones of the various ports on the central device 203. While this solution may avoid the need for physically changing connections when a DTE using a new protocol is introduced into the network, there is nonetheless a continuing need for intervention by a network manager.

It should be noted that in addition to the problems with requiring network manager intervention to allow switching of a DTE in a local area network, the prior art utilizes modular insertable cards as has been discussed. However, again as has been discussed, there is the need in the prior art to utilize one type of a modular card for support of one protocol and another type of a modular card for support of another protocol. This leads to issues with availability of necessary resources. For example, a hub concentrator in a local area network may have 3 CSMA protocol modular cards each having 16 ports for a total of 48 CSMA protocol ports and 2 token ring protocol modular cards each having 16 ports for a total of 32 token ring ports. However, the network, for various reasons, may have need to support say 56 CSMA protocol devices and only 24 token ring devices from the particular hub concentrator. Thus, although support is only required for 80 DTEs, the hub concentrator is not capable of supporting the required configuration without modification.

SUMMARY OF THE INVENTION

The present invention relates to methods and apparatus providing for a protocol independent switch for use in a data network such as a local area network (LAN).

A central device is provided that at least a first and a second port. The first port may, at some point in time, be coupled in communication with a DTE using the CSMA protocol. The second port may, at some point in time, be coupled in communication with a DTE using the token ring protocol. However, a later point in time, the DTE coupled with the second port may be removed from the network and replaced with a DTE using the token ring protocol. The central device provides a circuit for receiving a message from the DTE coupled in communication with the first port and for determining the protocol type of the message. After determining the protocol type, the circuit provides for configuring the port for communicating in the determined protocol. In this way, DTEs of which communicate in a plurality of protocols may inserted and removed from communication with the central device without need for intervention from the network manager.

Importantly, in the present invention, a single insertable modular card can support devices which transmit in any of a plurality of protocols. Thus, this leads to significant advantages in management of port resources in the network.

These and other aspects of the present invention will be discussed in greater detail with reference to the detailed description and the accompanying figures.

Figure 3:
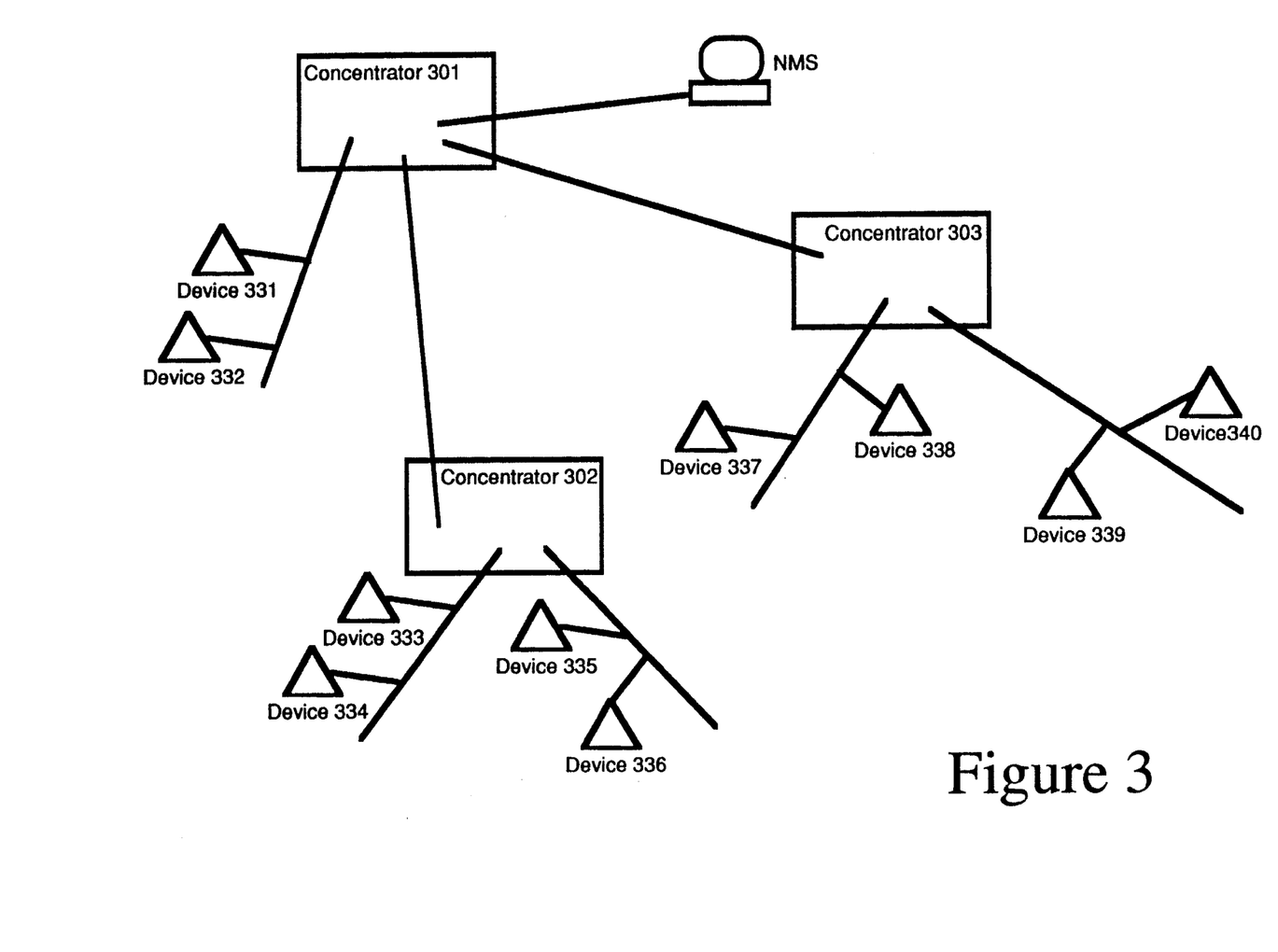
FIG. 3 is an illustration of a network such as may utilize the present invention.

For ease of reference, it is pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF AN EMBODIMENT OF THE PRESENT INVENTION

What is described herein is a method and apparatus for implementing a protocol independent switch in a local area network. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Generally, the present invention provides a network which comprises one or more central devices. Such central devices may include bridges, routers and hub concentrators. In the described embodiment, hub concentrators (such as concentrators 301, 302, 303) are illustrated. Each of the hub concentrators 301–303 may be coupled in communication with other DTEs such as DTEs 331–340. These DTEs 331–340 may be any of a number of well-known devices such as computers, printers, servers, etc.

Figure 4:
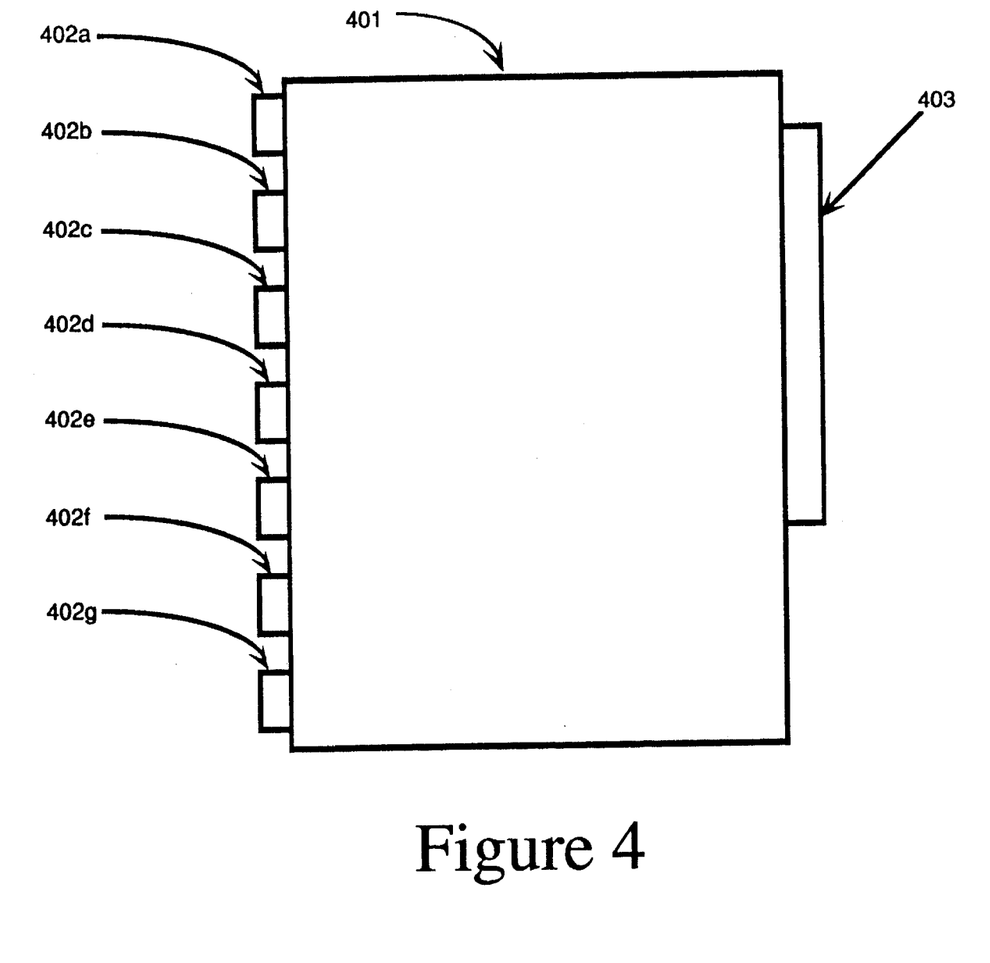
FIG. 4 is a high level illustration of a modular card such as may be utilized in an embodiment of the present invention.

In the described embodiment, the hub concentrators 301–303 utilize modular, insertable cards, such as card 401, which couple with a backplane of the concentrators 301–303. Card 401 comprises, preferably, 16 ports; however, for purposes of simplifying the drawing only 7 ports are illustrated as ports 402a–g. In addition, the card 401 provides for a connector 403 for coupling with a backplane in the hub concentrator. The backplane provides for communication between the various modular insertable cards in the concentrator.

As has been stated previously, the prior art provides for modular insertable cards; however, in the prior art each modular insertable card is designed for a particular protocol. For example, in prior art systems, one card may be designed for use with the CSMA protocol while another card may be designed for use with the token ring protocol. Importantly, as will now be seen, in the present invention, a single modular insertable card may be used in central devices in a local area network which will support multiple protocols. The design of an embodiment of ports on such a card will now be described in greater detail.

Figure 5:
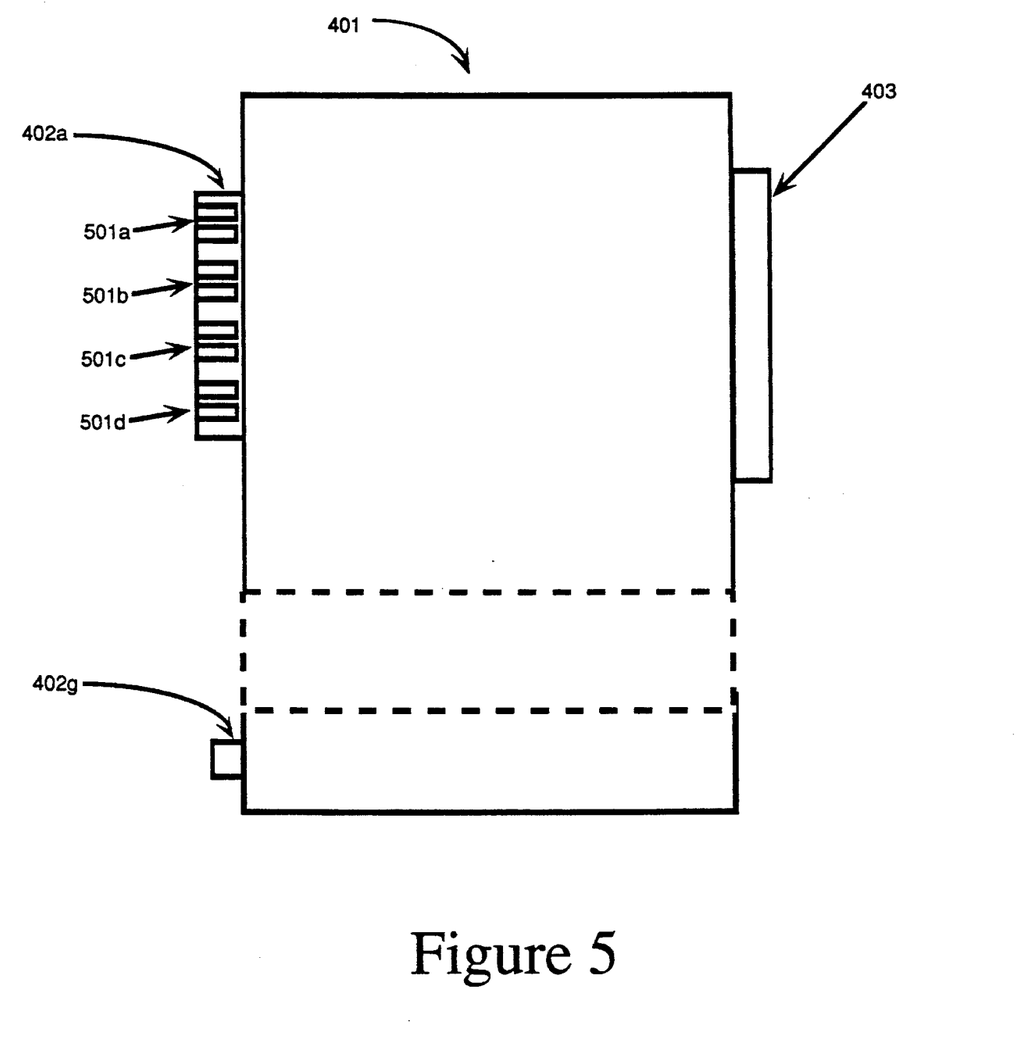
FIG. 5 is a high level illustration of a port on the modular card shown in FIG. 4.

FIG. 5 provides a high level illustration of a port on the modular card of FIG. 4. However, before providing a more detailed description of FIG. 5, it is worthwhile to discuss the IEEE 802.3 protocol (what has been referred to herein as the CSMA protocol) and the IEEE 802.5 protocol (what has been referred to herein as the token ring protocol) in some greater detail.

In the 802.3 protocol, DTEs use a carrier sense technique to arbitrate for access to the communication medium. DTEs wait until the medium is idle before transmitting. If two stations begin transmitting at the same time, they cause a collision on the medium and the transmitted data become unrecognizable. In the event of a collision, the transmitting DTEs wait a random period of time before again sensing the medium and, if it is idle, retransmitting. In the 802.5 protocol, a token passing scheme is used to arbitrate for access to the network. DTEs wait until they receive a token (a token is simply a predefined frame structure) before they begin transmitting.

The frame format of these two protocols differs. IEEE 802.3 networks use a 1500 byte frame with a header that consists of a 48 bit destination address and a 48 bit source address. The frame ends with a 32 bit frame check sequence field. IEEE 802.5 frames have a frame control field followed by a 48 bit destination address and a 48 bit source address. The end of the frame is a 32 bit frame check sequence and a 16 bit end-of-frame sequence. The 802.3 address fields and the 802.5 address fields have the same meaning. However, the actual bit ordering of the address is reversed.

The physical layer used by the different protocols differs as well. Of particular interest, the bit rate differs, the wires used for transmission at least in unshielded twisted pair (UTP) installations differ, the transmit signal level differs, and the magnetic components used for isolation from the cable plant differ. 802.3 networks use a bit rate of 10 Mbps and the signal is Manchester encoded. 802.5 networks use a bit rate of either 4 Mbps or 16 Mbps and use differential Manchester encoding.

Recognizing the differences between the various protocols and, importantly, recognizing the need for simplifying network management tasks and for improving utilization of network equipment, in particular, modular insertable cards in central devices such as hub concentrators, the present invention implements a circuit for determining, without network administrator intervention, the protocol type of a transmitted packet and for switching differing frame types on a single port on the card.

In designing a card to support multiple frame types, the card should be capable of transmitting any supported frame type from any input port to any output port. By designing the internal buffering in a manner which supports the maximum frame size, this objective can be accomplished. As one alternative in the described embodiment, the frame type, after it has been determined by the port, could be tagged onto the frame to be used in later determination of the frame type by other devices.

Important to the present invention is automatic detection and reconfiguration of the port dependent on the protocol being used. In the described embodiment which supports both CSMA and token ring (4 and 16 Mbps implementations), protocol type detection can be accomplished by examining two key parameters.

The first parameter is the active pairs of wires being used in an UTP installation. In the described embodiment, 8 conductor unshielded twisted pair (UTP) wiring is used for connecting DTEs in communication with the central device. As shown in FIG. 5, the 8 conductor wiring is connected to a port such as port 402a and the conductors (which will also be termed "wires" herein) are connected into sockets 501a–d. As illustrated, the sockets are logically organized into pairs for coupling into socket pairs 501a–d. In fact, in the described embodiment, prior art connectors may be utilized such as the well-known DB-11 connector.

Table I illustrates the use of these 4 pairs of wires in CSMA and token ring installations:

| Pair # | Wire #s | Use in CSMA | Use in Token Ring |
|---|---|---|---|
| 1 501a | 1, 2 | Transmit from end station to central device | Not used |
| 2 501b | 3, 6 | Transmit from the central device to the end station | Transmit from the end station to the central device |
| 3 501c | 4, 5 | Not used | Transmit from the central device to the end station |
| 4 501d | 7, 8 | Not used | Not used |

It has been recognized by the present invention that, in an implementation supporting CSMA and token ring protocols, if a signal is received at the central device on pair 1 (wires 1 and 2), the signal can be assumed to be from a DTE transmitting using the CSMA protocol. If a signal is received at the central device on pair 2 (wires 3 and 6), the signal can be assumed to be from a DTE transmitting using the token ring protocol.

A second parameter to be examined is the rate of transmission. As has been stated, CSMA protocol devices (at least by the current 802.3 standard) transmit at 10 Mbps. Token ring protocol devices transmit at either 4 Mbps or 16 Mbps. The described embodiment utilizes speed detection circuitry to make a determination on the protocol.

It should be noted that alternative embodiments may support more or different protocols. For example, speed detection circuitry may be used to distinguish between DTEs using the current 802.3 standard 10 Mbps protocol and a proposed new 100 Mbps CSMA protocol standard.

In any event, after determination of the incoming protocol type, the receive circuitry is reconfigured to match the detected protocol. In the case of an 802.3 frame, the frame receiver adapts to the address bit orientation, frame size and frame check sequence calculation defined by the standard. In the case of an 802.5 frame, the frame receiver adapts to that protocol frame structure.

Before turning to a more detailed description of the circuit for detecting protocol type and configuring a port which is utilized by the described embodiment, it is worthwhile to provide some discussion of alternatives to the described embodiment. First, as described, the detection and configuration circuitry is implemented in using discrete semiconductor devices. However, it is of course possible to implement the described circuitry in a custom semiconductor such as an ASIC. Of course, as another alternative, the described device could be implemented using electromechanical devices such as relays.

Also, the described embodiment is intended to support 3 protocols: (1) CSMA; (2) 4 Mbps token ring; and (3) 16 Mbps token ring. It is, of course, possible to provide for support of additional protocols using the basic techniques described herein.

Finally, it should be mentioned that networks using frame switching hubs can be built to restrict traffic between users. For example, a packet sent to the broadcast address can be forwarded by the switch to a subset of the attached ports. This subset of ports can be thought of as a "logical network" and logical networks provide a convenient way to administer the network. Using the present invention, the port's protocol type can be used to automatically select the port's logical network assignment. For example, if a user connects a CSMA station to a port, it may be anticipated that the user should be automatically connected to other users who have the same protocol on their attached devices. Likewise, if a user connects with a token ring adapter, it may be assumed that the user wishes to connect with users of other token ring protocol DTEs. By taking advantage of the automatic protocol detection circuitry of the present invention, the network can be configured to automatically place a DTE in a logical network dependent on the DTEs protocol type. This feature can further reduce the need for network administrator involvement.

Figure 6:
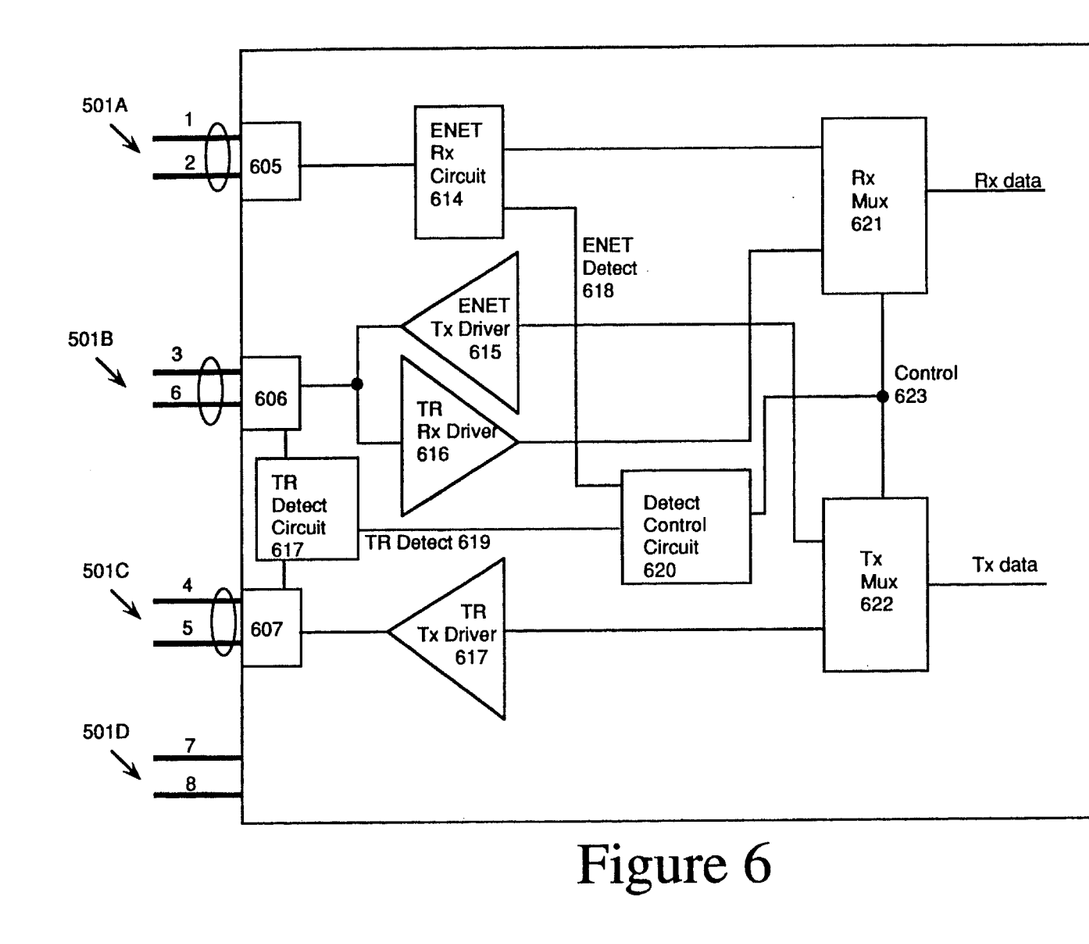
FIG. 6 is a block diagram illustrating the port of FIG. 5 and illustrating a circuit as may be used by an embodiment of the present invention for detecting and configuring the port dependent on the protocol of the DTE coupled with the port.

Turning now to FIG. 6, the port 402(a) including wire pairs 501(a)–(d) is illustrated in greater detail. As was discussed above, Ethernet utilizes pair 1 501(a) for receiving data and pair 2 501(b) for transmitting data while token ring utilizes pair 2 501(b) for receiving data and pair 3 501(c) for transmitting data.

Turning first to receiving Ethernet data, data received on pair 1 501(a) is first received at MAC interface 605 and then transmitted to Ethernet detect circuit 614 which includes a link beat detect circuit and an Ethernet receive driver. The link beat detect circuit drives signal ENET detect 618 while the received data is transmitted to receive multiplexor 621. ENET detect signal 618 is used as one input to detect control logic circuit 620. The other input to circuit 620 is TR detect signal 619. Detect control logic circuit 620 determines, based on its two inputs, whether Ethernet or token ring data is being received and provides an output control signal 623 which is used to control receive multiplexor 621 and transmit multiplexor 622 to transmit/receive either Ethernet or token ring data dependent on the network type detected by detect control logic circuit 620.

As has been discussed, pair 501(b) is utilized for both Ethernet transmit and Token Ring receive. Therefore, pair 501(b) is coupled through token ring bandwidth filter 606 to Ethernet transmit driver 615 and token ring receive driver 616. Ethernet transmit driver 615 is coupled to receive data from transmit multiplexor 622 and token ring receive driver 616 is coupled to provide data to receive multiplexor 621.

Token ring detect circuit 617 is also coupled to filter 606 and, as was discussed above, provides token ring detect signal 619 to detect control logic circuit 620.

Pair 501C is coupled through 16 Mbps magnetics 607 for transmitting data recieved from token ring transmit driver 617. Token ring transmit driver 618 is coupled to receive token ring data from transmit multiplexor 622.

Finally, as has been mentioned, pair 501D is not utilized in this configuration of the invention. However, it is important to point out that in other implementations of the present invention, different configurations are possible dependent on the particular network protocols that are supported by the particular implementation.

Thus, what has been disclosed is a method and apparatus which provides for switched routing of cells and packets in a data network.

What is claimed is:

1. A data network comprising:

(a) a concentrator having a first port and a second port;

(b) a first device coupled in communication with said first port of said concentrator, said first device capable of communicating information over said network;

(c) a second device coupled in communication with said second port of said concentrator, said second device capable of communicating information over said network;

(d) said concentrator further providing at said first port, a circuit for receiving a message packet from a device coupled to said first port and for determining the protocol type of said message packet.

2. The data network as recited by claim 1 wherein said circuit for receiving and determining comprises a coupling for accepting a first pair of wires for receiving data using a CSMA protocol, a second pair of wires for receiving data using a token ring protocol and for transmitting data using said CSMA protocol and a third pair of wires for transmitting data using said token ring protocol.

3. A concentrator for use in a data network which concurrently supports a plurality of communication protocols, said concentrator having at least a first port and a second port;

said first port for accepting and transmitting data to a first device, said first device communicating information on said data network in one of said plurality of communication protocols;

said second port for accepting and transmitting data to a second device, said second device communicating information on said data network in one of said plurality of communication protocols; and a first circuit for automatically configuring said first port, dependent on the communication protocol of data received from or transmitted to said first port, to receive and transmit data in one of said plurality of communication protocols.

4. The concentrator as recited by claim 3 wherein said concentrator further comprises a second circuit for configuring said second port, dependent on data received from and transmitted to said second port, to receive and transmit data in one of said plurality of protocols.

5. The concentrator as recited by claim 3 wherein said plurality of protocols includes CSMA and token ring.

6. A central device allowing for attachment of at least a first DTE and a second DTE, said central device comprising:

(1) a first port for accepting and transmitting data to said first DTE, said first DTE communicating information on said data network in one of a plurality of protocols;

(2) a second port for accepting and transmitting data to said second DTE, said second DTE communicating information on said data network in one of said plurality of protocols; and (3) a first circuit for receiving a message packet from said first DTE and for determining the protocol type of said message packet.

7. The central device as recited by claim 6 wherein said central device is a network concentrator.

8. The central device as recited by claim 6 wherein said central device is a bridge.

9. The central device as recited by claim 6 wherein said central device is a router.

10. The central device as recited by claim 6 wherein said plurality of protocols comprises CSMA and token ring.

11. The central device as recited by claim 6 wherein said central device further comprises a second circuit for configuring said second port, dependent on data received from and transmitted to said second port, to receive and transmit data in one of said plurality of protocols.

12. A modular card for use in a network concentrator of a data network which concurrently supports a plurality of communication protocols, said modular card comprising:

a first port for coupling said modular card to a first device which communicates a message packet over said data network;

a second port for coupling said modular card to a second device which communicates a message packet over said data network; and at least a first detection circuit, coupled to said first port, for identifying the communication protocol of a first message packet received from, or transmitted to, said first device, and for automatically configuring said first port to transmit and receive a message packet according to said identified communication protocol.

13. A modular card according to claim 12, including a second detection circuit, coupled to said second port, for identifying the communication protocol of a second message packet received from, or transmitted to, said second device, and for automatically configuring said second port to transmit and receive a message packet according to said identified communication protocol.

* * * * *